United States Patent [19]

Scott et al.

[11] Patent Number: 4,960,261
[45] Date of Patent: Oct. 2, 1990

[54] GAS CYLINDER CONNECTOR

[75] Inventors: Alistair Scott, Cambridge; Peter F. Clark, Woodnewton, both of England

[73] Assignee: Isoworth Limited, England

[21] Appl. No.: 247,176

[22] Filed: Sep. 21, 1988

Related U.S. Application Data

[63] Continuation-in-part of Ser. No. 25,952, Mar. 16, 1987, abandoned.

[30] Foreign Application Priority Data

Mar. 17, 1986 [GB] United Kingdom ............... 8606557
May 17, 1988 [GB] United Kingdom ............... 8811605

[51] Int. Cl.$^5$ ............................................. F16K 43/00
[52] U.S. Cl. .................................. 251/148; 137/322; 285/316
[58] Field of Search .................. 137/322, 318, 320; 251/129.19, 148, 82, 149.8; 285/316; 222/549, 545, 537

[56] References Cited

U.S. PATENT DOCUMENTS

| | | | |
|---|---|---|---|
| 1,150,420 | 8/1915 | Davis et al. | 137/322 |
| 2,620,817 | 12/1952 | Blaydes | 137/322 |
| 3,924,654 | 12/1975 | Buller et al. | 137/322 |
| 4,322,057 | 3/1982 | Yamenaka et al. | 251/141 |
| 4,683,908 | 8/1987 | Vigneau et al. | 137/329.1 |

FOREIGN PATENT DOCUMENTS

| | | |
|---|---|---|
| 134062 | 8/1984 | European Pat. Off. . |
| 223204 | 5/1987 | European Pat. Off. . |
| 238312 | 9/1987 | European Pat. Off. . |
| 2038970A | 11/1979 | United Kingdom . |
| 2188115A | 9/1987 | United Kingdom . |

Primary Examiner—A. Michael Chambers
Attorney, Agent, or Firm—Lerner, David, Littenberg, Krumholz & Mentlik

[57] ABSTRACT

A connector for connecting a carbon dioxide cylinder to a carbonation apparatus includes a female part having a cylindrical recess for receiving a male part carried by the carbonation apparatus. An axially movable actuator extending through the male part projects through a central passage at the bottom of the cylindrical recess to engage a valve member for opening the valve. The actuator is in three parts and the center part itself forms a valve which is closed when the actuator is depressed for supplying carbon dioxide from the cylinder to a carbonation chamber but which, when the actuator is released, may open response to pressure in the carbonation chamber for supplying carbon dioxide therefrom to another part of the apparatus, such as a concentrate supply device.

35 Claims, 4 Drawing Sheets

GAS CYLINDER CONNECTOR

This is a continuation in part of U.S. application Ser. No. 025952 filed Mar. 16, 1987, now abandoned, the contents of which are incorporated herein by reference.

This invention relates to connectors for pressurised gas and is particulary concerned with such connectors for connecting a vessel containing pressurised carbon dioxide to an apparatus for carbonating water, such as a home carbonation apparatus.

Conventional connectors of this type comprise a first part which is integral with a valve housing provided on the carbon dioxide supply vessel and which includes an axially displaceable valve and a second part which comprises a portion of the carbonation apparatus and includes a gas conduit for receiving gas from the vessel, a sealing member forming a gas seal between the two parts and a plunger which may be actuated to effect movement of the valve. The two parts are conventionally screw-threaded together. Known connectors suffer from the problem that proper operation of the valve is not assured. Further, the sealing surface of the vessel may be damaged in use, for example, by dropping, and as a result a proper seal is not achieved.

These problems are largely solved by the arrangement described in our copending European published Application No. 0 238 312 in which the carbonation apparatus is provided with the male part of the connector which is in the form of a hollow cylindrical member and within which a valve actuator is positioned for axial movement. The gas supply cylinder or vessel has the female part of the connector. Seal means are provided to form a ga seal between the male part and a cylindrical surface of the female part The gas cylinder or vessel includes a valve which is normally closed but can be moved to the opening position by operation of the valve actuator. A positive stop, acting between the male part of the connector and the female part, accurately positions the valve actuator so that the valve may be reliably operated. A locking device is also provided for locking the male and female parts together.

An aspect of the present invention concerns improvements in the above-described connector.

In one aspect, the invention provides a novel arrangement in which an improved seal is provided by the valve in the vessel.

In another aspect, an improved valve and actuator is provided permitting opening of the valve, even against high pressures within the gas cylinder, by means of a relatively low powered drive mechanism, such as a solenoid.

A further aspect of the invention provides an actuating mechanism for opening a valve in the gas cylinder, which actuating mechanism itself includes a valve arrangement which, in a first condition, connects the carbonation chamber to the gas supply vessel and, in a second condition, connects the carbonation chamber to another part of the apparatus, for example to a concentrate supply device for dispensing concentrate by means of a gas from the carbonation chamber.

The invention is described further by way of example with reference to the accompanying drawings in which:

FIG. 1 diagrammatically represents a carbonation apparatus in which the invention is embodied;

Figure 1:
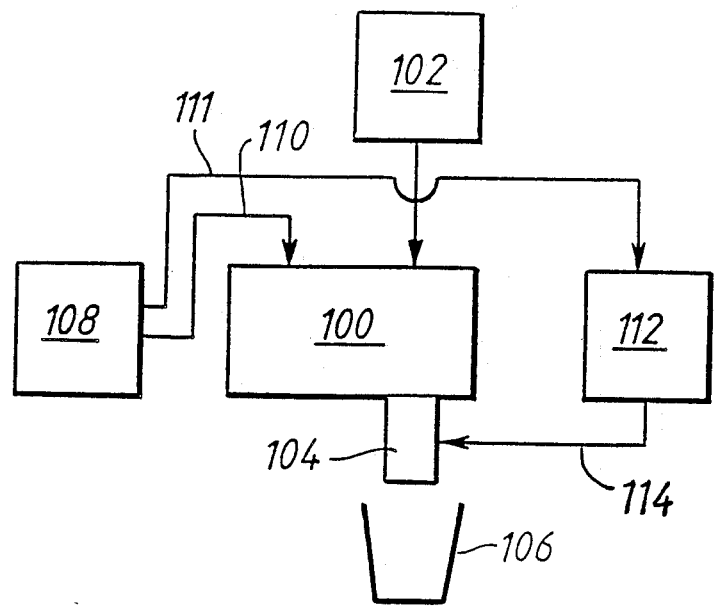

With reference to FIG. 1, the carbonation apparatus, for home use, is adapted for carbonating relatively small quantities of water such as sufficient to form one or two drinks, and comprises a carbonation chamber 100 to which is connected a water supply means 102 for supplying water to be carbonated, and which has a discharge valve arrangement 104 for discharging carbonated water into a vessel such as a glass 106. A carbon dioxide supply means 108 is connected to the chamber 100 by a conduit 110 for supplying carbon dioxide thereto. A concentrate supply arrangement 112 is connected to the discharge arrangement 104 by one or more conduits 114 for supplying flavoring to the carbonated water. A conduit 111 connected between the carbon dioxide supply means 108 and the concentrate supply arrangement 112 supplies carbon dioxide to the latter to cause it to supply concentrate, such carbon dioxide being obtained from the carbonation chamber 100 after completion of a carbonation operation as will be more fully understood from the description of FIG. 2. The chamber 100 contains a carbonating device which may be of conventional form, such as a nozzle for injecting carbon dioxide into the water, or is preferably as described in our published British Patent Application 2,161,089. The water supply arrangement and concentrate supply arrangement may also be as described in that published British patent application.

Figure 2:
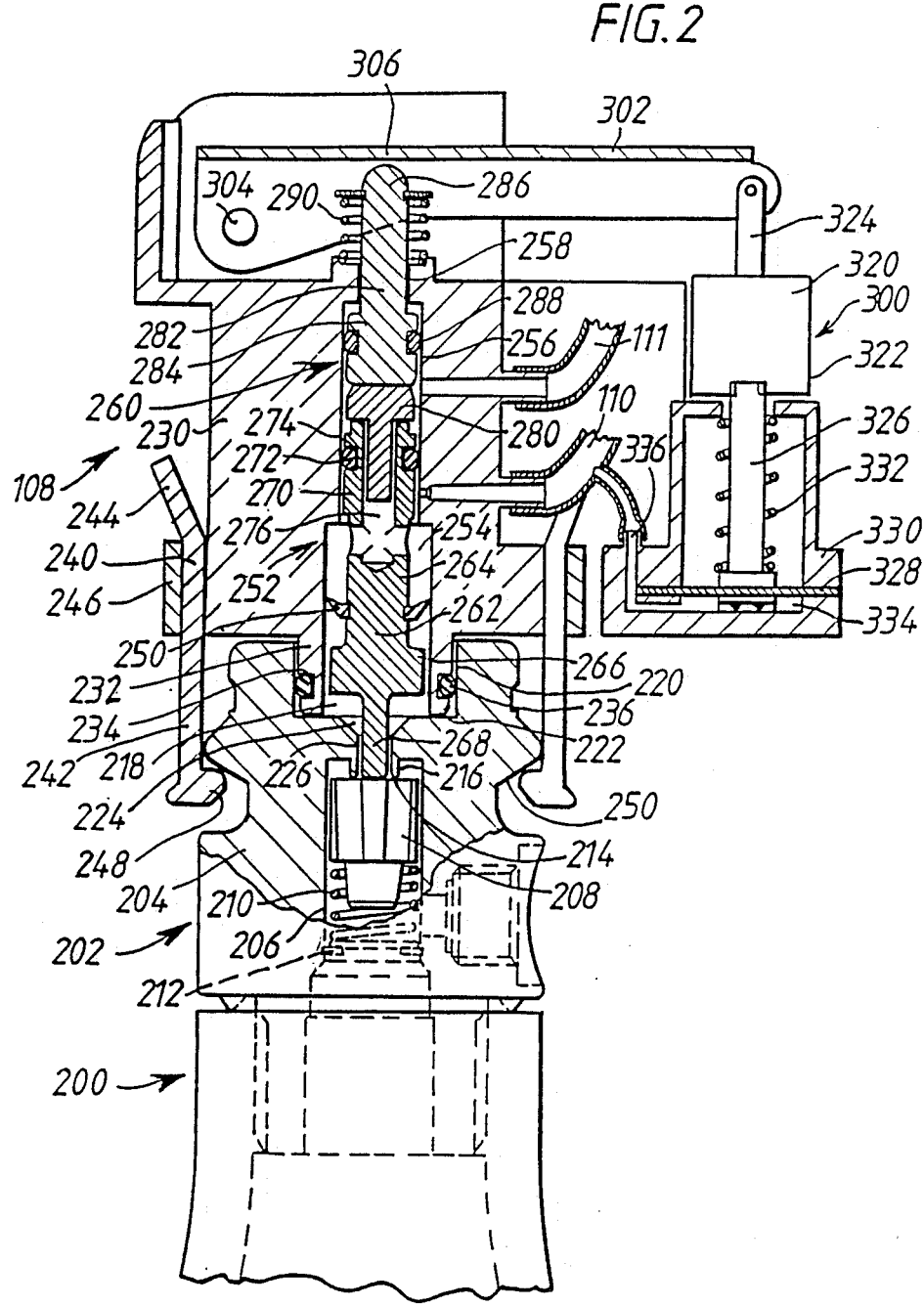
FIG. 2 shows a portion of the apparatus of FIG. 1, including a two-part connector according to a preferred embodiment of the invention, partly in section, with the parts connected together.
Figure 3:
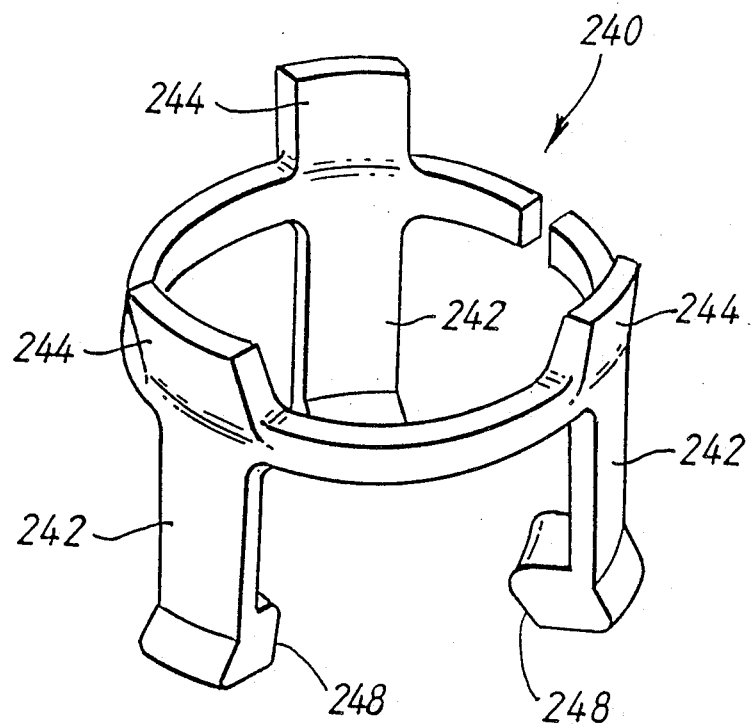
FIG. 3 is a perspective view of part of the connector of FIG. 2.

With reference to FIGS. 2 and 3, the carbon dioxide supply means 108 comprises a gas cylinder 200 containing carbon dioxide having a connector 202 secured thereto at the top by conventional means which need not be described. The connector 202 comprises a body 204 having a hollow interior portion 206 in which a solid polypropylene valve element 208 is mounted for vertical axial movement. Preferably, the polypropylene has a Rockwell Hardness in the range R85-110. A compression spring 210 whose lower end is supported by a ring 212 fixed in the body 204 urges the valve element into engagement with a valve seat 214 so that the valve is normally closed thus preventing the escape of carbon dioxide gas from the cylinder 200. The pressure inside the cylinder 200 may vary widely dependent upon ambient temperature and for example may range from 600 psi to around 2000 pis. To ensure that the valve element 208 may be moved downwardly away from the seat 214, in order to open the valve, by applying a relatively light force thereto under all pressure conditions likely to encountered whilst nevertheless assuring an excellent seal, the valve seat 214 is formed on the lower surface of a downwardly directed cylindrical projection 216 dimensioned carefully to achieve these results. A cylindrical recess 218 is formed at the top of the body 204 and includes smooth cylindrical walls 220, a radially extending bottom surface 222 and a countersink or flustoconical recess 224 in the center of the bottom surface 222 and communicating through a cylindrical passage 226 with the interior of projection 216.

The carbon dioxide supply means 108 also comprises a body 230 which may be molded of synthetic plastics material and which is secured to the carbonation apparatus. A cylindrical male member 232 is integrally formed with the body 230 and projects from the bottom thereof for insertion into the female cylindrical recess 218 when the connector parts 108 and 202 are connected together. An external groove 234 in the male member 232 contains an O-ring 236 which forms a gas tight seal with the smooth internal surface 220 of recess 218. The lower end of male member 232 engages the bottom surface 222 of the recess 218 to form a positive stop defining precisely the position of the male member 232 in the recess 218 when the two parts are fully connected together. Further, the provision of the sealing surface 220 inside the female connector minimises the risk of damage to that surface if the carbon dioxide supply vessel should be accidentally dropped.

A split ring 240 (shown in perspective in FIG. 3) is mounted arround the lower portion of housing 230 and is integrally formed with locking fingers 242 and lever portions 244, these parts being a unitary molding of resilient synthetic plastics material. Outward projections (not shown) on the body 230 retain the ring 240 against upwards and downwards movement relative to the body 230. The ring 240 is surrounded by a vertically slidable ring 246 which, when slid upwardly engages the lever portions 244 so as to pivot the fingers 242 outwardly to a non-locking position and, when slid downwardly (the position shown in FIG. 2) forces the fingers 242 inwardly so that inward projections 248 at the lower ends thereof engage a downwardly and outwardly facing frustoconical (or inclined) surface 250 provided on the body 204. The interaction between the projections 248 and surface 250 pulls the body 204 upwardly so that the lower end of male member 232 is held firmly against the surface 222 when the two parts are locked together.

A cylindrical passageway 252, which is coaxial with the male member 233, extends vertically through the body and includes a lower portion 254 of large diameter, a mid-portion 256 of intermediate diameter and an upper portion 258 of a small diameter.

A multipart slide 260 is provided in the passage 252 for vertical movement. A lower element 262 of the slide 260 comprises a main body portion 264 located in the large diameter portion 254 of passage 252 and has an outwardly directed flange 266 which is a relatively loose fit in the portion 254 so that gas may pass the flange 262. A valve actuating rod 268 integrally formed at the lower end of body 264 projects through passage 226 for engagement with the top surface of valve element 208. The element 262 includes an upper extension 270 which is located in the portion 256 of intermediate diameter of passage 252 and carries an O-ring seal 272 in an external groove 274. The O-ring 272 forms a gas tight seal and due to friction with the wall of portion 256 of passage 252, prevents the element 262 from falling out of the, body 230 when the connector part 204 is taken away. A passage 276 is formed through the extension 270 and its upper end is closed by a valve 280 which forms a center element of slide 260. An upper element 282 of slide 260 includes an enlarged portion 284 located in portion 256 of passage 252 and a narrower portion 286 projecting out of the top of the body 230 via narrow portion 258 of passage 252. An O-ring 288 carried by enlarged portion 284 of element 282 forms a gas tight seal with the inside surface of portion 256 of passage 252. A compression spring 290 urges element 282 upwardly.

A solenoid 300 (which will be described in more detail below) is connected to a lever 302 which is pivoted at 304 and arranged, when the solenoid is actuated, to be drawn downwardly so that an intermediate portion 308 of the lever presses the multipart slide 260 downwardly and the valve actuating rod 268 lifts the valve element 208 from the seat 214, thereby permitting carbon dioxide gas to be supplied to carbonation 100 via passage 226, 252 and conduit 110 which is connected to passage 252 as shown in the drawing. After carbonation has been completed, solenoid 300 is de-energised which permits lever 302 to pivot upwardly. The pressure of the carbon dioxide in chamber 100 is transmitted via conduit 110 into passages 252 and 276 and causes valve element 280 to be raised. Thus the carbon dioxide in the carbonation chamber 100 may be supplied to the concentrate supply device 112 via conduit 111 which is connected to passage 252 at a point above the O-ring 272. Thus, the multipart slides serves the dual function of an actuator for the valve 208 and the valve means for automatically connecting the carbonation chamber to the concentrate supply means following completion of a carbonation operation. Such arrangement is particularly compact and economi to manufacture.

It has already been indicated that the preferred carbonation means is as described in our UK Patent Application No. 2,160,089. Such apparatus utilises a vaned horizontal rotor which is driven at high speed and achieves carbonation within a few seconds utilising an atmosphere of carbon dioxide gas formed in a space above the water in the carbonation chamber which, accordingly, in operation is only partially filled with water. A means is necessary to control the carbonation pressure in the carbonation chamber so as to terminate the supply of carbon dioxide thereto when the required pressure is reached and to permit additional carbon dioxide to be supplied to the chamber as carbon dioxide gas is used up during the carbonation process. This is achieved in the preferred embodiment of the invention by the arrangement of the solenoid 300. The solenoid comprises a coil 320 indicated diagrammatically in FIG. 2 fixed in a housing 322. A link 324 connects the housing 322 to the arm 302. An armature 326 of the solenoid 300 has its upper end extending into the coil 320 and its lower end fixed to a diaphragm 328 whose periphery is fixed in a housing 330 which is secured to the body of the machine by means not shown. A compression spring 332 acting between the housing 330 and the armature 326 urges the armature downwardly. A pressure chamber 334 provided in the housing 330 below the diaphragm 328 is connected to the carbonation chamber 100 via conduit 336 and the conduit 110.

When the solenoid 300 is energised, the housing 322 is drawn downwardly, thereby pivoting the lever 302 as previously described, the strength of spring 332 being selected to ensure that at this time the housing moves downwardly rather than the armature being drawn upwardly. When the pressure in the carbonation chamber 100 reaches the required level, the diaphragm 328 is caused to move upwardly against the force of spring 332 so that the armature 326 and housing 322 both move upwardly thereby permitting the entire multipart slide 260 also to move upwardly so that the valve element 208 closes. However, at this time, the upper end of element 286 remains in contact with lever 308 ensuring that the valve element 280 remains closed.

If the pressure in the carbonation chamber drops, the spring 332 pushes the armature 326 downwardly, bringing with it the housing 322 thereby opening the valve 208 again to permit more carbon dioxide to be supplied to the carbonation chamber. This action may be repeated continuously until carbonation has been completed. Thereafter, as previously described, solenoid 300 is de-energised and valve 280 is opened.

A gasket 250 is provided on body 264 to catch any water which may be drawn into passage 252 from carbonation chamber 100 when the valve 280 is opened. Any such water which does enter passage 252 will largely be returned to chamber 100 when gas is supplied thereto for the next carbonation operation.

Preferably, an electrical control system (not shown) is included, for example as described in our UK Patent Application No. 2,160,089, for performing a carbonation cycle in which, automatically and in response to actuation of a start button, water is introduced into the carbonation chamber to the required level, thereafter the carbonation chamber is pressurised by energising the solenoid 300, the carbonating device is then energised to effect carbonation, and, after completion of carbonation, the solenoid 300 is deenergised and carbon dioxide is supplied from the carbonation chamber to the concentrate supply means.

As already discussed briefly, an important aspect of the present invention concerns the need for ensuring that the valve 208 provides a reliable gas tight seal but is nevertheless openable by a relatively light force. More particularly, one of the objects of the present invention is to provide improvements in this respect relative to the corresponding arrangement shown in our published European Application 0238312. One feature of the invention which particularly contributes to an improved seal is the use of a solid valve element of resilient material such as polypropylene as described, rather than a valve element which comprises a body and a separate sealing element carried thereby as illustrated in the above-mentioned European patent application.

A further particularly important improvement provided by the present invention compared to the arrangement shown in the above-mentioned European application is the arrangement of the valve actuator rod 268 so that, in operation, it projects into the passageway 226 which, during operation acts as a guide holding the actuating rod 268 in general (but not precise) axial alignment with the valve element 208. This makes it possible for the element 262 of slide 260 to be a loose fit in the passage 254 whereby gas may pass between the element 262 and the walls of the portion 254 without the need for providing gas passageways within the element 262 itself. A consequence of the loose fit, therefore, is that the actuating rod 268 is displaceable radially but as indicated, the arrangement whereby this projects into the passageway 226 ensures that despite the radial freedom resulting from the loose fit of element 262 in passage, 254, the correct operational relationship between valve element 208 and actuating rod 268 is maintained. Further, the relatively large countersink 224 provides a guide for the lower end of rod 268 which ensures that the rod 268 is properly guided into the passage 226 when the two parts of the connector are being interconnected. Thus, the size of the countersink 224 should be related to the radial freedom of element 262 within passage portion 254.

As will be appreciated, the full gas pressure within vessel 200 is applied to valve element 208. Thus, the valve area encompassed by the line of engagement between valve element 208 and valve seat 216 desirably is as small as possible, preferably less than about 20 mm$^2$ and more preferably less than about 10 mm$^2$. Passage 226 desirably has cross-sectional area in the same range. Recess 220 desirably is of substantial size to permit use of a relatively robust male connector part and to avoid all of the difficulties associated with miniature seals. Typically, recess 220 may have cross-sectional area of about 70 mm$^2$ or more, typically about 150 mm$^2$. Thus, the valve area defined by seat 216 preferably is substantially smaller than the cross-sectional area of the recess, and the cross-sectional area of the passageway also is substantially smaller than the crosssectional area of recess 220. As used in this disclosure, one area is "substantially smaller" than another area when the smaller area is less than about 20% of the larger area. Desirably the valve area and the cross-sectional area of the passageway are each about 15% of the cross-sectional area of the recess 220, or less.

Figure 4:
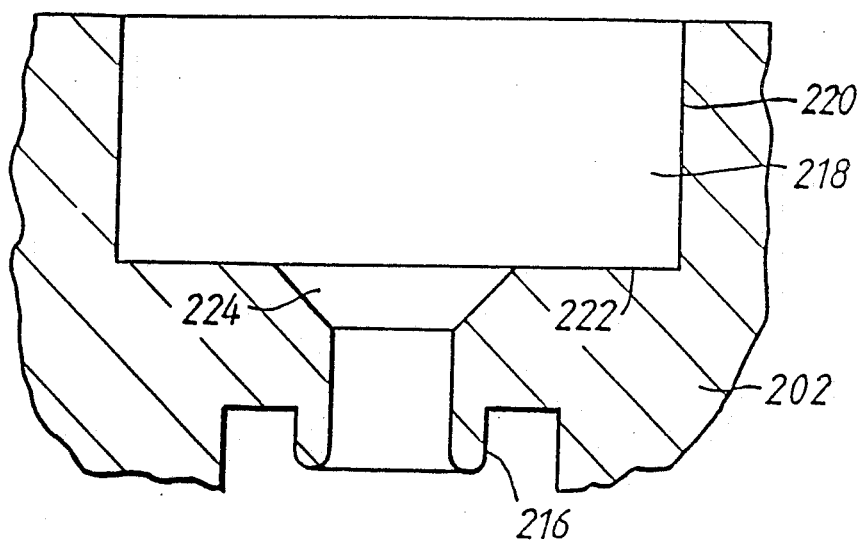
FIG. 4 illustrates part of the connector shown in FIG. 2 on an enlarged scale for the purpose of showing certain of the dimensions.

Particularly preferred dimensions for the relevant parts of connector part 204 are indicated on FIG. 4.

Figure 5:
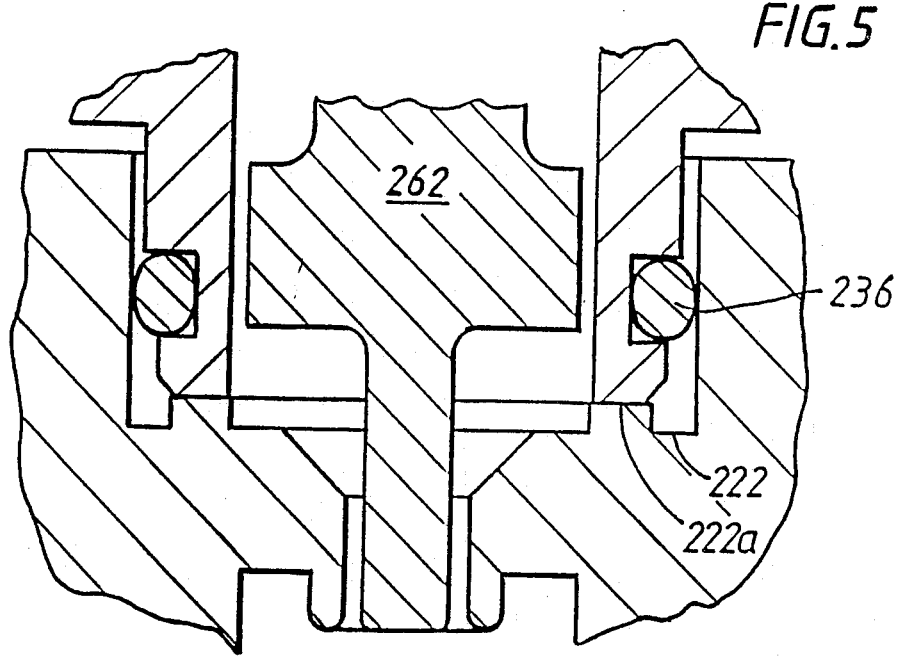
FIG. 5 illustrates a modification to the apparatus of FIG. 2.

FIG. 5 shows a modification in which, an annular upward projection 222a is provided on the surface 222 to act as a positive stop defining the position of male element 230 within female element 218. As will be appreciated from FIG. 5, the projection 222a should be positioned and dimensioned so as to be engaged by the end of element 230. Preferred dimensions are shown on FIG. 5.

In the embodiment discussed above, the female connector part or body 204 is physically secured to the top of the gas cyliner or vessel 200 containing carbon dioxide by conventional means such as meeting threads on the female connector part body 202 and vessel 200 or other equivalent means such as clips, bolts, adhesive bonding or the like. These provide a rigid connection of the female connector part or body 202 with the vessel 200. However, such a rigid connection is not essential. The female connector part and the dispensing apparatus will also work well where the female connector part is attached to the vessel by a hose, tube or the like, provided that the interior of the vessel can communicate with the valve means at the lower end of passage 226.

We claim:

1. A female carbon dioxide supply connector for attaching a carbon dioxide supply vessel to a male connector part of a carbonation apparatus which is to utilize carbon dioxide from said vessel, said female connector comprising:
   (a) a female connector part having a cylindrical recess with an open top end and a closed bottom end, the cylindrical surface of said recess being adapted to form a gas tight seal with the male connector part, said female connector part also having a passage below said recess and substantially coaxial therewith, said passage having a top end opening into the bottom of said recess and a bottom end remote from said recess;
   (b) means for connecting said female connector part to a vessel containing carbon dioxide so that carbon dioxide in said vessel is supplied to the bottom end of said passage;
   (c) normally closed valve means for normally blocking flow of carbon dioxide through said passage to said recess but permitting such flow upon physical engagement and displacement, whereby said valve means can be opened by an actuator rod connected in the male connector part; and (d) positive stop means for fixing the axial position of said male connector part in said recess when said male connector part is engaged in said recess.

2. A connector according to claim 1, wherein at least a part of said passage is of smaller cross-section than said recess, the female connector part including an inclined guide surface at the juncture of said cylindrical recess and the top end said passage for guiding the actuating rod into the passage.

3. A connector according to claim 2, wherein said inclined guide surface is substantially conical.

4. A connector according to claim 1, including a downwardly and outwardly inclined surface on the outside of said connector part for engagement by locking fingers for locking the male and female parts together.

5. A connector according to claim 1, wherein said positive stop means includes a radially extending bottom surface adjacent the bottom end of said cylindrical recess for forming a positive stop to be engaged by the male part.

6. A connector according to claim 1, wherein said normally closed valve means comprises a solid valve element of resilient material overlying the lower end of said passageway, said solid valve element having an upwardly facing surface directly engageable by a valve actuating rod for opening the valve.

7. A female carbon dioxide supply connector for attaching a carbon dioxide supply vessel to a male connector part of a carbonation apparatus which is to utilize carbon dioxide from said vessel, said female connector comprising:

(a) a female connector part having a cylindrical recess with an open top end and a closed bottom end, the cylindrical surface of said recess being adapted to form a gas tight seal with the male connector part, said female connector part also having a passage below said recess and substantially coaxial therewith, said passage having a top end opening into the bottom of said recess and a bottom end remote from said recess;

(b) means for connecting said female connector part to a vessel containing carbon dioxide so that carbon dioxide in said vessel is supplied to the bottom end of said passage;

(c) normally closed valve means for normally blocking flow of carbon dioxide through said passage to said recess but permitting such flow upon physical engagement and displacement, whereby said valve means can be opened by an actuator rod connected in the male connector part; said normally closed valve means including a downwardly facing valve seat on said female connector part surrounding the bottom end of said passage and a valve element disposed below said valve seat, said valve seat and said valve element being constructed and arranged so that said valve element can contact said valve seat only along a predetermined line of contact circumscribing a predetermined valve area, said valve area being substantially smaller than the cross-sectional area of said recess.

8. A connector as claimed in claim 7, wherein said valve seat includes a circular ridge projecting downwardly around the bottom end of said passage.

9. A vessel according to claim 8, wherein outside diameter of said circular ridge is approximately 3.5 mm.

10. A vessel according to claim 9, wherein the inside diameter of said circular ridge is approximately 2.5 mm.

11. A connector as claimed in claim 7, wherein said valve area is about 10 mm$^2$ or less.

12. A connector as claimed in claim 7, wherein said valve element is a unitary body of a resilient material, said unitary body overlying the entire lower end of said passage when engaged with said valve seat.

13. A connector as claimed in claim 12, wherein said resilient material has a Rockwell hardness of about R85 to about R110.

14. A carbon dioxide supply vessel comprising a female connector as claimed in claim 7 and a hollow vessel body having an interior space containing carbon dioxide, said means for connecting said female connector part to a vessel including means for attaching said female connector part to said vessel body so that the interior space of said vessel body communicates with said valve means.

15. The combination of a vessel according to claim 14 and a carbonation apparatus having a cylindrical male connector part and a sealing ring, said male connector part being received in said cylindrical recess of said female connector part, said sealing ring being engaged between the cylindrical male connector part and the said female connector part so as to provide a substantially gas tight seal with said cylindrical inner surface of said recess in said female connector part, locking means for locking said male and female connector part to one another, and a valve actuator rod extending through said male connector and axially movable relative thereto, said valve actuator rod abutting said valve element, whereby downward movement of said valve actuator will displace said valve element away from said seat and open said valve means.

16. The combination according to claim 15, wherein said valve actuator rod projects into said passage for opening said valve.

17. The combination according to claim 16, wherein said valve actuator rod includes a tip portion projecting into said passage and projecting through said valve area when said valve means is open, said tip portion of said rod bring freely and non-sealingly received within said passage so that carbon dioxide can flow through said passage around the exterior of said tip portion when said valve means is open.

18. The combination as claimed in claim 17, wherein said tip portion of said rod is devoid of internal passageways.

19. The combination as claimed in claim 15 further comprising positive stop means for fixing the axial position of said male connector part in said recess at a predetermined axial location relative to said female connector part.

20. The combination according to claim 19, wherein said locking means comprises a plurality of resilient locking fingers carried on one of said connector parts movable generally radially with respect thereto, and an inclined surface on the other one of said connector parts, said fingers being engageable with said inclined surface, said inclined surface being shaped to draw said connector parts together upon engagement with said fingers and radially inward movement of said fingers.

21. A female carbon dioxide supply connector for attaching a carbon dioxide supply vessel to a male connector part of a carbonation apparatus which is to utilize carbon dioxide from said vessel, said connector comprising:

(a) a female connector part having a cylindrical recess with an open top end and a closed bottom end, the cylindrical surface of said recess being adapted to form a gas tight seal with the male connector part, said female connector part also having a passage below said recess and substantially coaxial therewith, said passage having a top end opening into the bottom of said recess and a bottom end remote from said recess at least a part of said passage being of substantially smaller cross-section than said recess;

(b) means for connecting said female connector part to a vessel containing carbon dioxide so that carbon dioxide in said vessel is supplied to the bottom end of said passage; and (c) normally closed valve means for normally blocking flow of carbon dioxide through said passage to said recess but permitting such flow upon actuation by an actuating rod of the carbonation apparatus inserted in said passage, whereby said valve means can be opened by an actuator rod connected in the male connector part, said passage being devoid of internal seals and being adapted to freely and non-sealingly engage an actuator rod inserted therein, whereby carbon dioxide can flow around the exterior of the actuator rod when said valve means is open.

22. A connector according to claim 21, wherein the female connector part includes an inclined guide surface at the juncture of said cylindrical recess and the top end said passage for guiding the actuating rod into the passage.

23. The combination of a female connector according to claim 21 and a carbonation apparatus having a cylindrical male connector part and a sealing ring, said male connector part being received in said cylindrical recess of said female connector part, said sealing ring being engaged between the cylindrical male connector part and the said female connector part so as to provide a substantially gas tight seal with said cylindrical inner surface of said recess in said female connector part, locking means for locking said male and female connector part to one another, and a valve actuator rod extending through said male connector and axially movable relative thereto, said valve actuator rod, having a tip portion extending into said passage in said female part and abutting said valve means, said tip portion of said actuator rod being freely and non-sealingly engaged in said passage.

24. The combination as claimed in claim 23, wherein said tip portion of said rod is devoid of internal passageways.

25. A carbon dioxide supply connector for use with carbonation apparatus and with a carbon dioxide supply vessel having a connector part which comprises a female member having an internal space defined by an internal cylindrical surface, a stop surface located within said female member, an inclined external locking surface, a passage which has a cross-section narrower than and which at one end communicates with the interior of the female member and a valve which normally closes said passage but which is openable to put the passage in communication with the interior of the vessel; the carbon dioxide supply connector comprising:

a conduit for supplying carbon dioxide to the carbonation apparatus; and a further connector part for detachably interconnecting the conduit with the connector part of the carbon dioxide supply vessel; said further connector part comprising a male member which has a hollow interior in communication with said conduit and which is adapted to be slidably inserted into the female member, the end of the male member being adapted to engage said stop surface to positively define the position of the male member relative to the female member when fully inserted therein; a sealing member disposed on the outside of the male member and adapted to cooperate with said cylindrical surface of said female member to form a gas tight seal therewith; a valve actuator positioned in the hollow interior of the male member and adapted to be axially movable for opening the valve of the connector part of the vessel; resilient locking fingers positioned outwardly of the male member and projecting beyond the end thereof, each said finger having an inwardly directed projection adapted to engage said locking surface of said connector part of said vessel; and means for moving the locking fingers inwardly to a locking position and holding them in said locking position so that the engagement between the locking surface and the locking fingers may draw said male member into said female member and hold said male member in said defined position therein.

26. A carbon dioxide supply connector according to claim 25, including stop means defining a retracted position of said actuator.

27. A connector part for a carbon dioxide supply vessel for detachably connecting the vessel to a carbon dioxide supply connector according to claim 25, said connector part comprising:

a female member having an internal space open at one end to receive a male member, said internal space being defined by an internal cylindrical surface adapted to cooperate with a sealing member on the male member to form a gas tight seal therewith;

an external locking surface which is adapted to be engaged by inwardly directed projections of locking fingers of the carbon dioxide supply connector when said locking fingers are moved inwardly, said locking surface being inclined to face outwardly and away from said one end of said female member such that inward movement of said locking fingers draws the male member into said female member;

a stop located within said female member and adapted to cooperate with the end of the male member to form a positive stop which defines the position of the male member within the female member when the locking fingers are in their locking position;

a passage which has a cross-sectional narrower than the internal space of the female member and which at one end communicates with the internal space of the female member; and a valve for closing said passage, said valve being normally closed and being openable by axial movement of a valve actuator in the interior of the male member to place the interior of the supply vessel in communication with said conduit via said passage and said male and female members.

28. A connector part according to claim 27, wherein said stop surface is constituted by an end surface of said internal space of said female member.

29. A connector part according to claim 27 wherein said stop surface is provided by a radial projection or rib inside said internal space of said female member.

30. A connector part according to claim 27, wherein said one end of said passage comprises a divergent conical recess in an end surface of said female member.

31. A connector part according to claim 27, wherein said locking surface is frustoconical 32. A connector part according to claim 27, in which said valve comprises a stem located in said passage.

33. A connector part according to claim 27, in combination with a carbon dioxide supply vessel to which said connector part is secured.

34. A connecting joint comprising:
(a) a first connector part having:
   (1) a female member having an internal space open at one end to receive a male member, said internal space being defined by an internal cylindrical surface adapted to cooperate with a sealing member on the male member to form a gas tight seal therewith;
   (2) an external locking surface, said locking surface being inclined to face outwardly and away from said one end of said female member;
   (3) a stop located within said female member and adapted to cooperate with the end of the male member to form a positive stop which defines the position of the male member within the female member;
   (4) a passage which has a cross-section narrower than the internal space of the female member and which at one end communicates with the internal space of the female member;
   (5) a valve for closing said passage, said valve being normally closed and being openable by axial movement of a valve actuator in the interior of the male member to place the interior of the passage in communication with said interior space of said female member; and
(b) a carbon dioxide supply connector having:
   (1) a conduit for supplying carbon dioxide to the carbonation apparatus; and
   (2) a further connector part for detachably interconnecting the conduit with the first connector part; sad further connector part comprising a male member which has a hollow interior in communication with said conduit and which is adapted to be slidably inserted into the female member, the end of the male member being engaging said stop in said female member to positively define the position of the male member relative to the female member; a sealing member disposed on the outside of the male member and cooperating with said cylindrical surface of said female member to form a gas tight seal therewith; a valve actuator positioned in the hollow interior of the male member and adapted to be axially movable for opening the valve of the first said connector part; resilient locking fingers positioned outwardly of the male member and projecting beyond the end thereof, each said finger having an inwardly directed projection engaging said locking surface of said connector part of said vessel; and means for moving the locking fingers inwardly to a locking position and holding them in said locking position so that the engagement between the locking surface and the locking fingers draws said male member into said female member and holds said male member in said defined position therein.

35. The connecting joint of claim 34, further comprising a carbon dioxide supply vessel containing carbon dioxide and communicating with said passage of said first connector part and a carbonation apparatus connected to said conduit of said carbon dioxide supply connector.

* * * * *

UNITED STATES PATENT AND TRADEMARK OFFICE
CERTIFICATE OF CORRECTION

PATENT NO. : 4,960,261
DATED : October 2, 1990
INVENTOR(S) : Scott et al.

It is certified that error appears in the above-identified patent and that said Letters Patent is hereby corrected as shown below:

```
Column 1, line 34, "ga" should read --gas--.
Column 2, line 53, delete "pis" and insert therefor --psi--.
Column 4, line 8, after "carbonation", insert --chamber--.
          line 24, "economi" should read --economical--.
Column 7, line 8, after "end", insert --of--.
Column 8, line 41, delete "bring" and insert therefor --being--.
Column 12, line 5, delete "sad" and insert therefor --said--;
           line 9, delete "being".
```

Signed and Sealed this

Third Day of March, 1992

Attest:

HARRY F. MANBECK, JR.

*Attesting Officer*  *Commissioner of Patents and Trademarks*